United States Patent
Park et al.

(10) Patent No.: US 9,538,411 B2
(45) Date of Patent: Jan. 3, 2017

(54) METHOD FOR TRANSFERRING A STATUS REPORT AND A COMMUNICATION DEVICE THEREOF IN A WIRELESS COMMUNICATION SYSTEM

(71) Applicant: LG ELECTRONICS INC., Seoul (KR)

(72) Inventors: Sungjun Park, Seoul (KR); Youngdae Lee, Seoul (KR); Seungjune Yi, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/402,275

(22) PCT Filed: Jul. 15, 2013

(86) PCT No.: PCT/KR2013/006303
§ 371 (c)(1),
(2) Date: Nov. 19, 2014

(87) PCT Pub. No.: WO2014/025141
PCT Pub. Date: Feb. 13, 2014

(65) Prior Publication Data
US 2015/0146617 A1    May 28, 2015

Related U.S. Application Data

(60) Provisional application No. 61/680,240, filed on Aug. 6, 2012.

(51) Int. Cl.
*H04W 24/10* (2009.01)
*H04W 24/00* (2009.01)
(Continued)

(52) U.S. Cl.
CPC ............. *H04W 24/10* (2013.01); *H04W 24/00* (2013.01); *H04W 24/08* (2013.01); *H04W 28/06* (2013.01); *H04W 72/04* (2013.01); *H04W 80/02* (2013.01)

(58) Field of Classification Search
CPC ...... H04W 28/06; H04W 24/00; H04W 80/02; H04W 24/10; H04W 24/08; H04W 72/04
(Continued)

(56) References Cited

U.S. PATENT DOCUMENTS

2004/0147236 A1   7/2004   Parkvall et al.
2011/0149905 A1   6/2011   Kim
(Continued)

FOREIGN PATENT DOCUMENTS

KR   10-2010-0055171 A   5/2010

OTHER PUBLICATIONS

3GPP TS 36.323 Packet Data Convergence Protocol (PDCP) specification, dated Mar. 2011, 27 pages.*
(Continued)

*Primary Examiner* — Jae Y Lee
*Assistant Examiner* — Jean F Voltaire
(74) *Attorney, Agent, or Firm* — Birch, Stewart, Kolasch & Birch, LLP

(57) ABSTRACT

There is provided a method for transferring a status report in a wireless communication system, the method comprising: configuring a Packet Data Convergence Protocol (PDCP) status report used by a PDCP layer located above a Radio Link Control (RLC) layer, the PDCP status report including an indicator indicating a count value of a first non-received service data unit (SDU); and transferring the configured PDCP status report to a lower layer. The indicator may be first missing sequence number count (FMS COUNT) value which contains the count value of the first non-received PDCP SDU.

16 Claims, 13 Drawing Sheets

(51) Int. Cl.
    *H04W 28/06*     (2009.01)
    *H04W 24/08*     (2009.01)
    *H04W 80/02*     (2009.01)
    *H04W 72/04*     (2009.01)

(58) Field of Classification Search
    USPC .................................................. 370/328–332
    See application file for complete search history.

(56) References Cited

U.S. PATENT DOCUMENTS

2011/0228746 A1*   9/2011   Chun .................... H04W 28/06
                                                                            370/331
2012/0147750 A1*   6/2012   Pelletier ................ H04W 28/02
                                                                            370/235

OTHER PUBLICATIONS

3GPP TS 36.323, V10.1.0, (Mar. 2011), Technical Specification "3rd Generation Partnership Project; Technical Specification Group Radio Access Network; Evolved Universal Terrestrial Radio Access (E-UTRA); Packet Data Convergence Protocol (PDCP) specification", (Release 10).

* cited by examiner

(a)

(b)

(a)

(b)

METHOD FOR TRANSFERRING A STATUS REPORT AND A COMMUNICATION DEVICE THEREOF IN A WIRELESS COMMUNICATION SYSTEM

CROSS REFERENCE TO RELATED APPLICATIONS

This application is the National Phase of PCT/KR2013/006303 filed on Jul. 15, 2013, which claims priority under 35 U.S.C. 119(e) to U.S. Provisional Application No. 61/680,240 filed on Aug. 6, 2012, all of which are hereby expressly incorporated by reference into the present application.

TECHNICAL FIELD

The present invention relates to wireless communication, and more specifically, to a method for transferring a status report and a communication device thereof in a wireless communication system.

BACKGROUND ART

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

Examples of techniques employed in the 3GPP LTE-A include carrier aggregation.

The carrier aggregation uses a plurality of component carriers. The component carrier is defined with a center frequency and a bandwidth. One downlink component carrier or a pair of an uplink component carrier and a downlink component carrier is mapped to one cell. When a user equipment receives a service by using a plurality of downlink component carriers, it can be said that the user equipment receives the service from a plurality of serving cells. That is, the plurality of serving cells provides a user equipment with various services.

Meanwhile, a packet data convergence protocol (PDCP) is used for functions of user data delivery, header compression, and ciphering in a user plane and used for functions of control-plane data delivery and ciphering/integrity protection in the control plane.

And, a PDCP status report is used to inform a transmitting side about a status of a reception buffer for a PDCP entity of a receiving side.

DISCLOSURE OF INVENTION

Technical Problem

In the related art as above explained, the PDCP status report is used to inform a status of reception buffer for a PDCP entity. However, a mount to be informed by the PDCP status report is not enough to support a high speed of communication.

Therefore, an object of the present invention is to provide a solution to the above-described problem.

Solution to Problem

To achieve these and other advantages and in accordance with the purpose of the present invention, as embodied and broadly described herein, there is provided a method for transferring a status report in a wireless communication system, the method comprising: configuring a Packet Data Convergence Protocol (PDCP) status report used by a PDCP layer located above a Radio Link Control (RLC) layer, the PDCP status report including an indicator indicating a count value of a first non-received service data unit (SDU); and transferring the configured PDCP status report to a lower layer. The indicator may be first missing sequence number count (FMS COUNT) value which contains the count value of the first non-received PDCP SDU.

To achieve these and other advantages and in accordance with the purpose of the present invention, as embodied and broadly described herein, there is also provided a communication device configured for transferring a status report in a wireless communication system, the communication device comprising: a configuring unit for configuring a Packet Data Convergence Protocol (PDCP) status report used by a PDCP layer located above a Radio Link Control (RLC) layer, the PDCP status report including an indicator indicating a count value of a first non-received service data unit (SDU); and a transmission unit for transferring the configured PDCP status report to a lower layer. The indicator may be an FMS COUNT value which contains the count value of the first non-received PDCP SDU.

The PDCP status report may further include a bitmap providing the status information for a set of SDUs following the first non-received SDU.

The bitmap may be filled to indicate which PDCP SDUs are missing and indicate which PDCP SDUs do not need retransmission.

In the bitmap, the PDCP SDUs indicated as being missing may denote whether a PDCP SDU has not been received or has been received but has not been decompressed correctly. In the bitmap, the PDCP SDUs indicated as not needing retransmission may denote whether a PDCP SDU has been received correctly.

In the bitmap, a '0' bit may indicate the PDCP SDU with PDCP Sequence Number=(the PDCP SN of the FMS COUNT+bit position) modulo (maximum PDCP SN+1) is missing. And, in the bitmap, a '1' bit may indicate the PDCP SDU with PDCP Sequence Number=(the PDCP SN of the FMS COUNT+bit position) modulo (maximum PDCP SN+1) does not need to be retransmitted.

The FMS COUNT may have a size of 32 bits located between a Protocol Data Unit (PDU) type field and the bitmap in the PDCP status report.

Advantageous Effects of Invention

The present disclosure provides a way that the receiving side transmits the PDCP Status Report in which the COUNT value of the first PDCP SDU which has not been successfully received is indicated. According to such way, even if the size of the PDCP SN increases, it is not required to change the size of the COUNT value with respect to PDCP SDU and thus is also not required to change the structure of PDCP Status Report. So, the base station has the advantage on the implementation.

MODE FOR THE INVENTION

Figure 1:
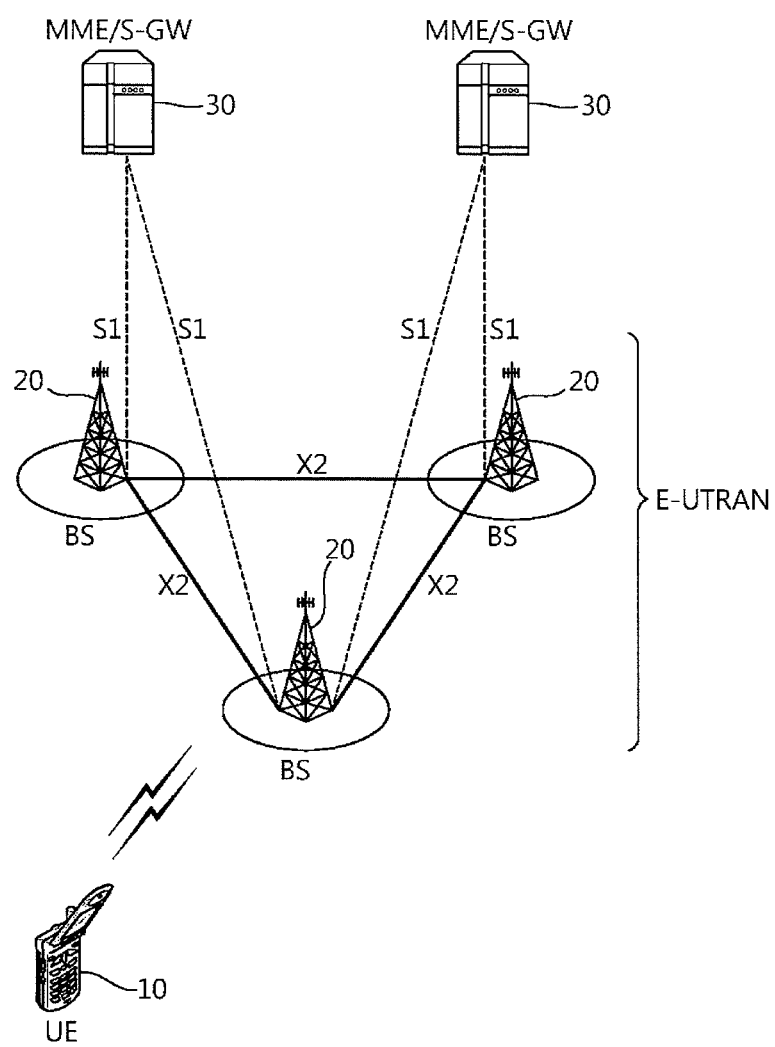
FIG. 1 shows a wireless communication system to which the present invention is applied.

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail of a drain device and a refrigerator having the same according to an embodiment, with reference to the accompanying drawings.

The present invention will be described on the basis of a universal mobile telecommunication system (UMTS) and an evolved packet core (EPC). However, the present invention is not limited to such communication systems, and it may be also applicable to all kinds of communication systems and methods to which the technical spirit of the present invention is applied.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

The terms used herein including an ordinal number such as first, second, etc. can be used to describe various elements, but the elements should not be limited by those terms. The terms are used merely to distinguish an element from the other element. For example, a first element may be named to a second element, and similarly, a second element may be named to a first element.

In case where an element is "connected" or "linked" to the other element, it may be directly connected or linked to the other element, but another element may be existed therebetween. On the contrary, in case where an element is "directly connected" or "directly linked" to another element, it should be understood that any other element is not existed therebetween.

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings. The spirit of the invention should be construed as being extended even to all changes, equivalents, and substitutes other than the accompanying drawings.

There is an exemplary UE (User Equipment) in accompanying drawings, however the UE may be referred to as terms such as a terminal, a mobile equipment (ME), a mobile station (MS), a user terminal (UT), a subscriber station (SS), a wireless device (WD), a handheld device (HD), an access terminal (AT), and etc. And, the UE may be implemented as a portable device such as a notebook, a mobile phone, a PDA, a smart phone, a multimedia device, etc, or as an unportable device such as a PC or a vehicle-mounted device.

FIG. 1 shows a wireless communication system to which the present invention is applied.

The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
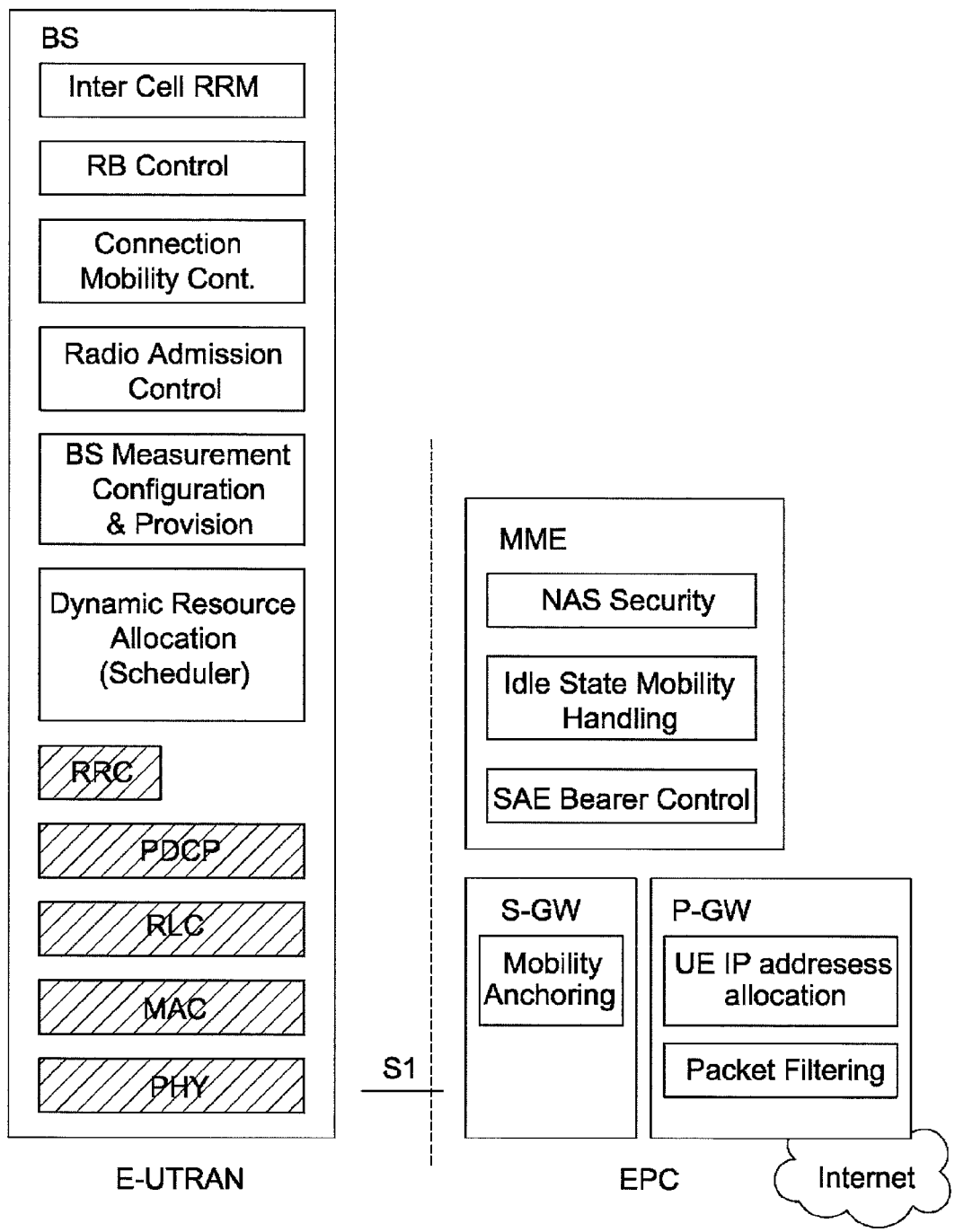
FIG. 2 is a block diagram showing functional split between the E-UTRAN and the EPC.

FIG. 2 is a block diagram showing functional split between the E-UTRAN and the EPC.

Slashed boxes depict radio protocol layers and white boxes depict the functional entities of the control plane. Referring to FIG. 2, a BS performs the following functions. (1) Functions for Radio Resource Management such as Radio Bearer Control, Radio Admission Control, Connection Mobility Control, Dynamic allocation of resources to UEs in both uplink and downlink (scheduling), (2) IP (Internet Protocol) header compression and encryption of user data stream, (3) Routing of User Plane data towards S-GW, (4) Scheduling and transmission of paging messages, (5) Scheduling and transmission of broadcast information, and (6) Measurement and measurement reporting configuration for mobility and scheduling.

The MME hosts the following functions. (1) NAS (Non-Access Stratum) signaling, (2) NAS signaling security, (3) Idle mode UE Reachability, (4) Tracking Area list management, (5) Roaming, (6) Authentication. The S-GW hosts the following functions. (1) Mobility anchoring, (2) lawful interception.

The PDN gateway (P-GW) hosts the following functions. (1) UE IP (interne protocol) allocation, (2) packet filtering.

Figure 3:
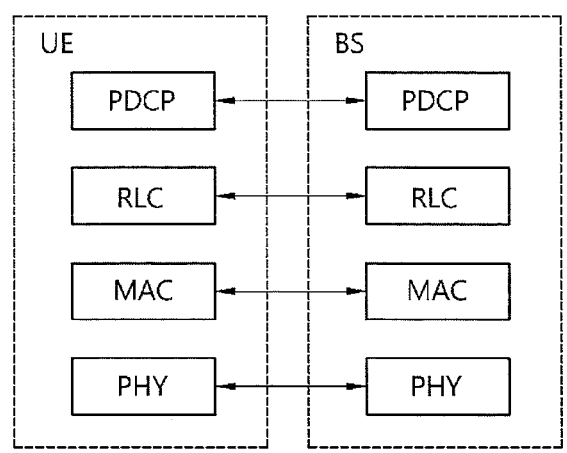
FIG. 3 is a diagram showing a radio protocol architecture for a user plane.
Figure 4:
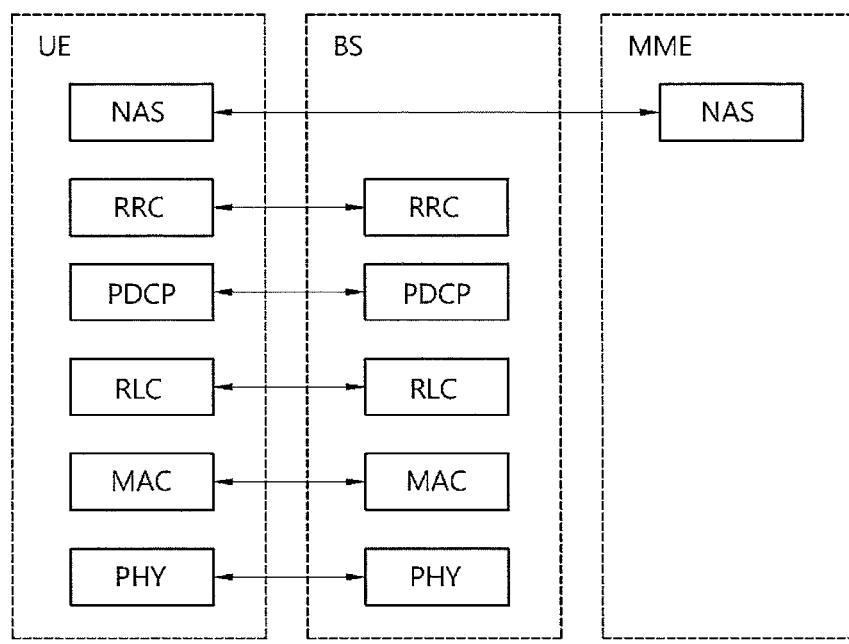
FIG. 4 is a diagram showing a radio protocol architecture for a control plane.

FIG. 3 is a diagram showing a radio protocol architecture for a user plane. FIG. 4 is a diagram showing a radio protocol architecture for a control plane.

The user plane is a protocol stack for user data transmission. The control plane is a protocol stack for control signal transmission.

Referring to FIGS. 3 and 4, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data is transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (also may be referred as an RRC connected mode), and otherwise the UE is in an RRC idle state (also may be referred as an RRC idle mode).

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Hereinafter, an RRC state of a UE and an RRC connection mechanism will be described.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Next, system information will be described.

The system information includes essential information that must be known to a UE to access a BS. Thus, the UE has to receive all of the system information before accessing the BS. Further, the UE must always have the latest system information. Since the system information is information that must be known to all UEs in one cell, the BS periodically transmits the system information.

According to the section 5.2.2 of 3GPP TS 36.331 V8.4.0 (2008-12) "Radio Resource Control (RRC); Protocol specification (Release 8)", the system information is classified into a master information block (MIB), a scheduled block (SB), and a system information block (SIB). The MIB allows the UE to know a physical configuration (e.g., bandwidth) of a particular cell. The SB reports transmission information (e.g., a transmission period or the like) of SIBs. The SIB is a group of a plurality of pieces of system information related to each other. For example, an SIB includes only information of a neighbor cell, and another SIB includes only information of an uplink radio channel used by the UE.

In general, a service provided by the network to the UE can be classified into three types to be described below. Further, according to which service can be provided, the UE recognizes a cell type differently. A service type will be first described below, and then the cell type will be described.

1) Limited service: This service provides an emergency call and an earthquake and tsunami warning system (ETWS), and can be provided in an acceptable cell.

2) Normal service: This service denotes a public use service for general use, and can be provided in a suitable or normal cell.

3) Operator service: This service denotes a service for a network service provider, and a cell can be used only by the network service provider and cannot be used by a normal user.

The service type provided by a cell can be classified as follows.

1) Acceptable cell: This cell serves a UE with a limited service. This cell is not barred from the perspective of the UE, and satisfies a cell selection criterion of the UE.

2) Suitable cell: This cell serves a UE with a regular service. This cell satisfies a condition of the acceptable cell, and also satisfies additional conditions. Regarding the additional conditions, this cell has to belong to a PLMN to which the UE can access, and a tracking area update procedure of the UE must not be barred in this cell. If the corresponding cell is a CSG cell, this cell must be accessible by the UE as a CSG member.

3) Barred cell: Information indicating that a cell is a barred cell is broadcast in this cell by using the system information.

4) Reserved cell: Information indicating that a cell is a reserved cell is broadcast in this cell by using the system information.

Now, a radio link failure will be described.

A UE persistently performs measurement to maintain quality of a radio link with a serving cell from which the UE receives a service. The UE determines whether communication is impossible in a current situation due to deterioration of the quality of the radio link with the serving cell. If it is determined that the quality of the serving cell is so poor that communication is almost impossible, the UE determines the current situation as a radio link failure.

If the radio link failure is determined, the UE gives up maintaining communication with the current serving cell, selects a new cell through a cell selection (or cell reselection) procedure, and attempts RRC connection re-establishment to the new cell.

Figure 5:
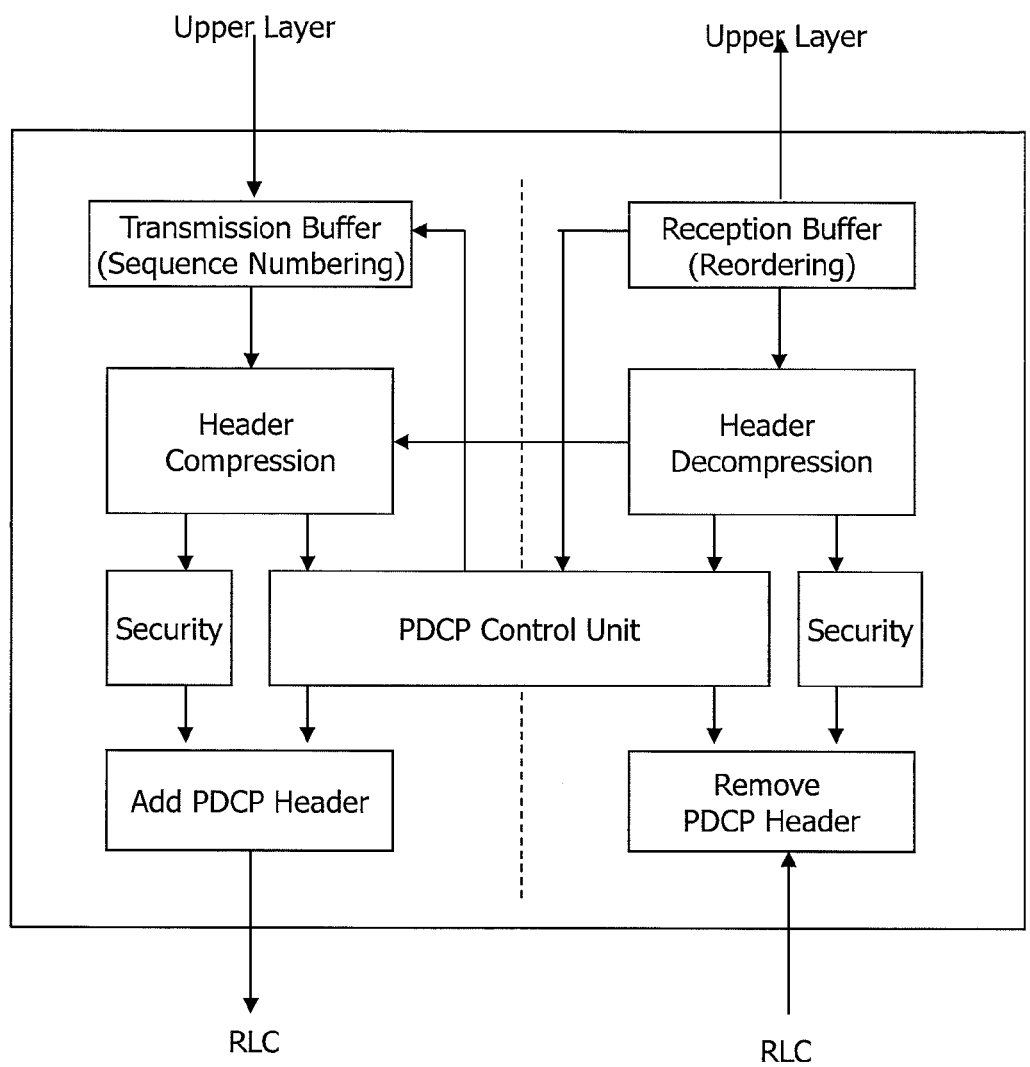
FIG. 5 shows an exemplary PDCP entity of the PDCP layer of FIG. 3

FIG. 5 shows an exemplary PDCP entity of the PDCP layer of FIG. 3

FIG. 5 will be referred to in describing the PDCP layer in more detail as follows. An exemplary PDCP entity of the PDCP layer of FIG. 3 is shown. The PDCP entity of FIG. 5 is connected to the RRC layer or a user application located thereabove, and connected to the RLC layer therebelow. This PDCP entity is comprised of a transmitting side and a receiving side.

In FIG. 5, the left side depicts the transmitting side having a transmission buffer, a header compression unit, a security handling unit, and a PDCP header attachment unit, while the right side depicts the receiving side having a PDCP header removal unit, security handing unit, header compression cancellation unit and a reception buffer. Such transmitting side and receiving side share a PDCP control unit.

The transmitting side PDCP entity forms PDUs (Protocol Data Units) using SDUs (Service Data Units) received from the upper layer or using control information that was generated by the PDCP entity itself and then transmits such PDUs to a peer PDCP entity (i.e. a PDCP entity within the RNS) at the receiving side. This PDCP entity at the receiving side converts the received PDCP PDUs into PDCP SDUs or extracts control information from the received PDCP PDUs.

It should be noted that the functional blocks shown in FIG. 3 can be implemented in many different ways as could be understood by those skilled in the art.

As mentioned previously, The PDUs generated by the PDCP entity at the transmitting side can be distinguished as Data PDUs and Control PDUs.

The PDCP Data PDU is a data block that is made at the PDCP entity by processing the SDU received from an upper layer. The PDCP Control PDU is a data block that the PDCP entity itself generates in order to transfer control information to a peer PDCP entity.

The PDCP Data PDU is generated for the radio bearer (RB) of both the user plane (U-plane) and of the control plane (C-plane), and some of the PDCP functions are selectively applied to the user plane.

Namely, the header compression function is applied for only the U-plane data, and the integrity protection function among the functions of the security handling unit is applied only for the C-plane data. In addition to the integrity protection function, the security handling unit also has a ciphering function that maintains data security, and such ciphering function applies to both U-plane data and C-plane data.

The PDCP Control PDU is generated only by the radio bearer (RB) of the U-plane, and there are two types: (1) a PDCP status report message (i.e. PDCP Status Report) used to inform the transmitting side about the PDCP entity reception buffer status and (2) a Header Compression Feedback Packet used to inform about the header decompressor state to the header compressor of the transmitting side.

Figure 7:
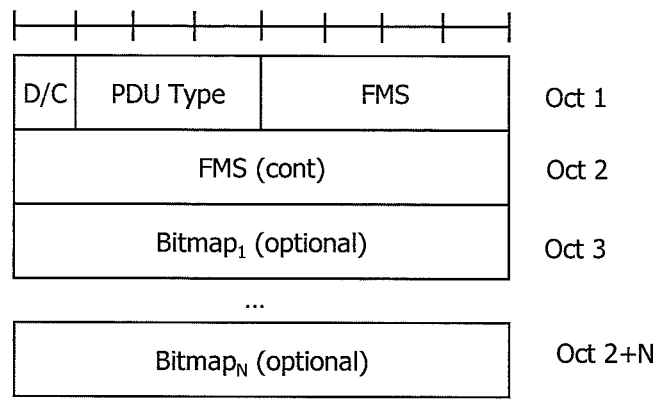
FIG. 7 shows an exemplary PDCP Status PDU generated by the PDCP Control Unit of FIG. 5.

The PDCP status report message (PDCP Status Report message) is transmitted from the receiver PDCP to the transmitter PDCP in order to inform the transmitter PDCP about the PDCP PDUs that were received or not received by the receiver PDCP, such that non-received PDCP SDUs can be retransmitted received PDCP SDUs need not be retransmitted. This PDCP status report message can be send in the form of a PDCP Status PDU, and its exemplary structure is shown in FIG. 7.

Figure 6:
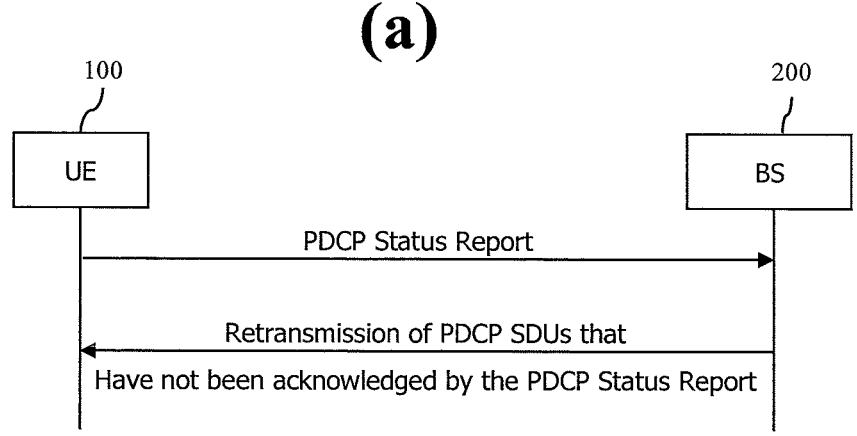
FIG. 6 shows an exemplary operation between UE and a serving cell according to PDCP layer.
Figure 6:
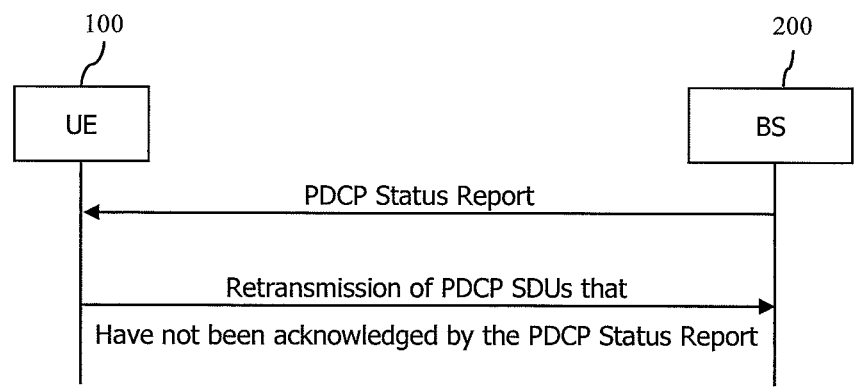

FIG. 6 shows an exemplary operation between UE and a serving cell according to PDCP layer.

Referring to FIG. 6(a), a UE 100 may transmit the PDCP status report to a BS 200. The PDCP status report message includes information indicating that the PDCP SDUs that were received or not received. Then, the BS 200 may retransmit the PDCP SDUs which have not been received by the UE 100 based on the PDCP status report.

Also, referring to FIG. 6(b), the BS 200 may transmit the PDCP status report to the UE 100. Then, the UE may retransmit the PDCP SDUs which have not been received by the BS 200 based on the PDCP status report This PDCP status report message can be send in the form of a PDCP Status PDU, and its exemplary structure is shown in FIG. 7.

FIG. 7 shows an exemplary PDCP Status PDU generated by the PDCP Control Unit of FIG. 5.

As can be seen, the PDCP Status PDU is comprised of one or more octets (1 octet =8 bits) that includes a D/C (Data/Control) field, a PDU Type field, a First Missing Sequence Number (FMS) field, and a bit map (Bitmap) field.

The D/C field is comprised of 1 bit that is used to inform whether the corresponding PDU is a Data PDU or a Control PDU.

The PDU Type field is comprised of 3 bits used to inform about the type of Control PDU. For example, the value of '000' signifies a PDCP Status Report, the value of '001' signifies Header Compression Feedback Information, and other types of values are reserved for future use.

The FMS field is comprised of 12 bits and is used to indicate the sequence number (SN) of the first PDCP SDU that was not received by the receiver (i.e., a first out-of-sequence PDCP SDU, a first not received PDCP SDU, a first missing PDCP SDU, etc.).

The Bitmap field is of variable length, and if a bit value of 0 indicates that the data of that position was not received properly, while a bit of 1 indicates that the data of that position was successfully received.

Such PDCP Status Report can be used for various types of situations that would require PDCP re-establishment, such as handover (HO) situations.

The transmitting side (such as the UE 100 or the BS 200) PDCP entity receives PDCP SDUs from the upper layer and stores them a transmission buffer after transmission in case retransmission is later required. Thereafter, when handover (or other PDCP re-establishment situation) occurs, a report about the PDCP SDUs that were received and the PDCP SDUs that were not received are provided via a PDCP Status Report and the PDCP SDUs that were not received are retransmitted after handover.

For example, the PDCP entity in the mobile terminal receives PDCP SDUs from the upper layer, transmits them to the base station, and stores them in a transmission buffer even after transmission. Then, when handover (or some other situation requiring PDCP re-establishment) occurs, the mobile terminal receives information (via a PDCP Status Report that is fed back) about the PDCP SDUs not received by the base station, and such PDCP SDUs are retransmitted.

As described above, when handover (or some other situation requiring PDCP re-establishment) occurs, the Node B changes from the source to the target, and since the PDCP entity also changes, retransmissions must be used.

An example of PDCP Status PDU generation procedure is as follows.

First, upon deciding that a PDCP Status Report message should be transmitted, a status report (as indicated below) is compiled, made into a PDU format for transmission, and submitted to the lower layer setting the FMS field to indicate the PDCP Sequence Number of the first missing (or out-of-sequence) PDCP SDU;

allocating, as the length of the Bitmap field, the length of the value (i.e. the number of PDCP sequence numbers) from (and not including) the first not received (out-of-sequence) PDCP SDU up to (and including) the last out-of-sequence PDCP SDU received. Here, this Bitmap field length is 8 bits maximum. If less than 8 bits, rounding up to the next multiple of 8 bits is performed, while if over 8 bits, the next Bitmap field is used;

setting the corresponding bit positions of the Bitmap field as 0. Here, 0 signifies the PDCP SDUs not received from the transmitter by the lower layer or signifies the PDCP SDUs that were received but header decompression was unsuccessful. (Namely, setting as '0' in the corresponding position in the bitmap field all PDCP SDUs that have not been received as indicated by lower layers and optionally, PDCP PDUs for which decompression has failed);

setting the corresponding bit positions of the Bitmap field as 1. Here, 1 signifies other PDCP SDUs (not described above), namely, the PDCP SDUs that were successfully received at the lower layer. (Namely, indicating in the bitmap field as '1' all other PDCP SDUs).

Figure 8:
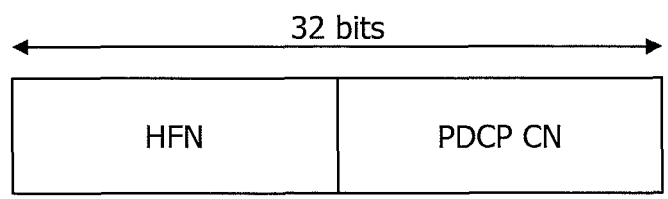
FIG. 8 is a view showing the format of a COUNT value generated by the PDCP Control Unit of FIG. 5.

Such PDCP status report may be transmitted during a handover procedure in LTE and/or LTE-A. In more detail, the PDCP entity of the transmitting side maintains PDCP SDU(s) which is delivered from a higher layer even after transmitting the PDCP SDU(s) to the receiving side, in order to prepare a retransmission. Afterwards, If the handover is performed, the PDCP entity of the transmitting side receives, from the receiving side, the PDCP status report indicating PDCP SDU(s) which has not been received by the receiving side and then retransmits the PDCP SDU(s) which has not been received by the receiving side. Especially, after the handover is completed, since the transmitting side is changed from a source BS (e.g., source eNodeB) to a target BS (e.g., target eNodeB) and the PDCP entity is also changed from the source BS to the target BS, the receiving side should transmit the PDCP status report to avoid an ambiguity between the transmitting side and the receiving side about which PDCP SDU is successfully received FIG. 8 is a view showing the format of a COUNT value generated by the PDCP Control Unit of FIG. 5.

The PDP entity maintains a COUNT value for ciphering and integrity. That is, inputs required for the ciphering function each includes a COUNT value. As illustrated in FIG. 8, the length of the COUNT value is 32 bits and the COUNT value includes an HFN and a PDCP SN. The length of the PDCP SN is configured by upper layers. The size of the HFN is equal to 32 minus the length of the PDCP SN.

The length of the PDCP SN is set to one of 5 bits, 7 bits, 12 bits according to characteristics of the Radio Bearer. The PDCP SN is inserted into the PDCP PDU by the PDCP entity of the transmitting side and transmitted to the receiving side. The length of the HFN in the COUNT is equal to 32 bits minus (−) the length of the PDCP SN. The HFN is internally managed by the PDCP entity of the transmitting side and the PDCP entity of the receiving side, respectively. Whenever the PDCP entity is reestablished, a value of HFN is initially set to 0. Then, whenever the PDCP SN is circulated (or warped around), the value of HFN is increased by 1.

In LTE system, the adoption of various technologies, such as the MIMO and the CA can provide much higher speed (peak data rate) of the service than the conventional system. However, since the current size of the PDCP SN is restricted to a maximum of 12 bits, the PDCP entity of the transmitting side transmits data with a transmission rate of less than 1 Gbps. Even if it is possible for the PDCP entity of the transmitting side to transmit data in a very high speed, it results in quickly increasing the value of the PDCP SN thereby using more than half of the length of the PDCP SN during a round trip time (RTT) and thus the value of the HFN of the transmitting side may be asynchronous with the value of the HFN of the receiving side. As a result, the PDCP entity of the transmitting side can transmit 2048 (4096/2) IP packets of 1500 byte during RTT of 25 ms and thus the transmitting rate is limited to 980 Mbps. As such, there is a technical limitation which cannot increase the transmission rate over 1 Gbps.

Therefore, the size of the PDCP SN is required to be increased and the size of the FMS field of PDCP Status Report is also required to be increased. One way is to increase both of the size of the FMS field and the size of the PDCP SN. For example, the size of PDCP SN is increased to 15 bits, the size of the FMS field is also increased to 15 bits. Such way, however, causes that there may be many kinds of the PDCP status report. To handle this, the UE and the BS should exchange information on the kinds of PDCP Status Report. But it makes the implementation to be complicated.

Accordingly, the present disclosure proposes one way such that the PDCP entity of the receiving side transmits the PDCP status report in which a COUNT value with respect to the first PDCP SDU which has not been received is indicated. Then, The PDCP entity of the transmitting side can recognize the SN of the first PDCP SDU, which has not been received by the receiving side based on a portion of the PDCP SN in the COUNT value of the PDCP status report.

Figure 9:
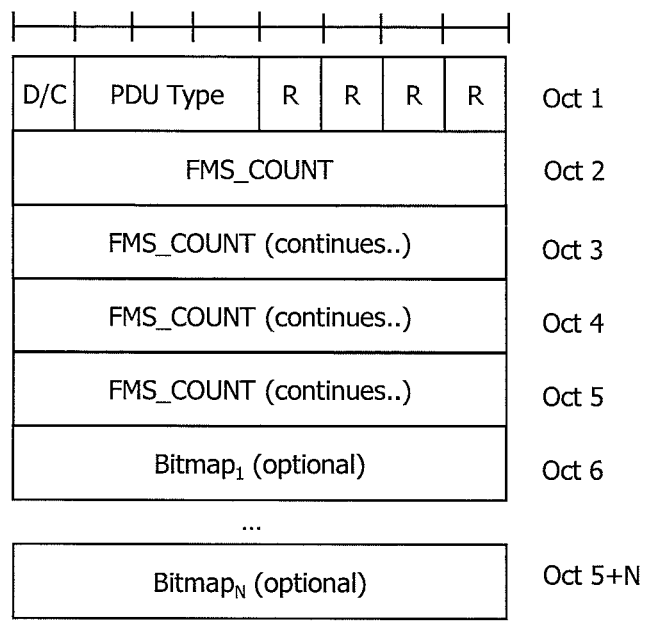
FIG. 9 shows an exemplary structure of PDCP Status PDU according to one embodiment proposed in this disclosure.

FIG. 9 shows an exemplary structure of PDCP Status PDU according to one embodiment proposed in this disclosure.

As can be seen, the PDCP Status PDU is comprised of one or more octets (1 octet=8 bits) that includes a D/C (Data/Control) field, a PDU Type field, reserved fields, a FMS COUNT field, and a bit map (Bitmap) field.

The D/C field is comprised of 1 bit that is used to inform whether the corresponding PDU is a Data PDU or a Control PDU.

The PDU Type field is comprised of 3 bits used to inform about the type of Control PDU. For example, the value of '000' signifies a PDCP Status Report, the value of '001' signifies Header Compression Feedback Information, and other types of values are reserved for future use.

The reserved fields are arranged for future use.

The FMS_COUNT field is comprised of 32 bits and is used to indicate the COUNT value of the first PDCP SDU that was not received by the receiver (i.e., a first out-of-sequence PDCP SDU, a first not received PDCP SDU, a first missing PDCP SDU, etc.).

The Bitmap field is of variable length, and if a bit value of 0 indicates that the data of that position was not received properly, while a bit of 1 indicates that the data of that position was successfully received.

In other words, the Bitmap field indicates whether at least one or more PDCP SDUs satisfying the following condition have been successfully received or not by the receiving side:

PDCP SDU SN=(the PDCP SN of FMS_COUNT+
bit position)modulo(maximum PDCP SN+1)

Figure 10:
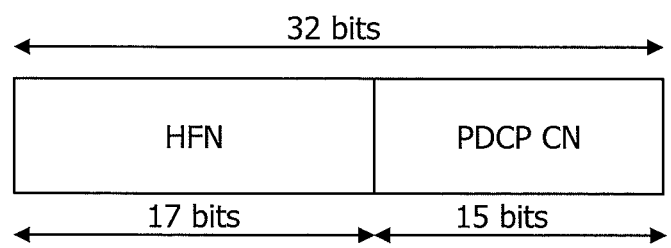
FIG. 10 is a view showing the format of a COUNT value according to an embodiment proposed in this disclosure.

FIG. 10 is a view showing the format of a COUNT value according to an embodiment proposed in this disclosure.

As illustrated in FIG. 10, the length of the COUNT value is 32 bits and the COUNT value includes an HFN and a PDCP SN.

The length of the PDCP SN is extended up to 15 bits. The size of the HFN is equal to 32 minus the length of the PDCP SN.

Hereinafter, one example will be described that the PDCP entity of the receiving side constructs the PDCP Status Report. First, it is assumed that the length of PDCP SN is set to 15 bits. The PDCP entity of the receiving side receives the PDCP SDUs with SN=1, 1, 3, 4, 5, and 7, respectively. In this case, the PDCP entity of the receiving side constructs the PDCP Status Report including the FMS_COUNT field in which the first un-received PDCP SDU SN=2 and the HFN=1 are indicated. In other words, the PDCP entity of the receiving side sets HFN of 17 bits to a value 1 and the PDCP SN of 15 bits to a value 2.

And then, the PDCP entity of the receiving side sets the Bitmap field such that the PDCP SDUs with SN=3, 4, 5, and 7 have been successfully received (i.e., corresponding bit positions are set to 1) and the PDCP SDU with SN=6 has not been successfully received (i.e., a corresponding bit position is set to 0).

After constructing the PDCP status report, the PDCP entity of the receiving side transmits it to the PDCP entity of the transmitting side.

The PDCP entity of the transmitting side interprets the received PDCP status report as follows.

The PDCP entity of the transmitting side determines that the PDCP SDU indicated by the portion of the PDCP SN in the FMS_COUNT field of the PDCP status report is the first PDCP SDU which has not been successfully received by the receiving side. For example, in case when the length of the PDCP SN is set to 15 bits, the PDCP entity of the transmitting side recognizes the 15 least significant bits (LSBs) in the FMS_COUNT field as indicating the SN of the PDCP SDU which has not been successfully received by the receiving side.

And then, the PDCP entity of the transmitting side recognizes that at least one or more PDCP SDUs marked as a bit 1 in the Bitmap field have been successfully received by the receiving side. Conversely, the PDCP entity of the transmitting side recognizes that at least one or more PDCP SDUs marked as a bit 0 in the Bitmap field have not been successfully received by the receiving side. And, the PDCP entity of the transmitting side can recognize the SN with respect to the at least one or more PDCP SDUs marked as a bit 0 or bit 1 in the Bitmap field from the Equation as follows:

(the PDCP SN of the FMS_COUNT+bit position) modulo(maximum PDCP SN+1)

For example, when the length of the PDCP SN is set to 15 bits, the PDCP SN in the FSM_COUNT field indicates 2, and the Bitmap field is set to 11101, the PDCP entity of the transmitting side determines, based on the first bit position set to 1, the PDCP SDU with PDCP SN satisfying (2+1) modulo (32767+1)=3 as having been successfully received by the receiving side. In the same way, the PDCP entity of the transmitting side determines the PDCP SDUs with PDCP SNs=4, 5, and 7 as having been successfully received by the receiving side. However, the PDCP entity of the transmitting side determines, based on the bit position set to 0, the PDCP SDU with PDCP SN satisfying (2+4) modulo (32767+1)=6 as having not been successfully received by the receiving side.

Figure 11:
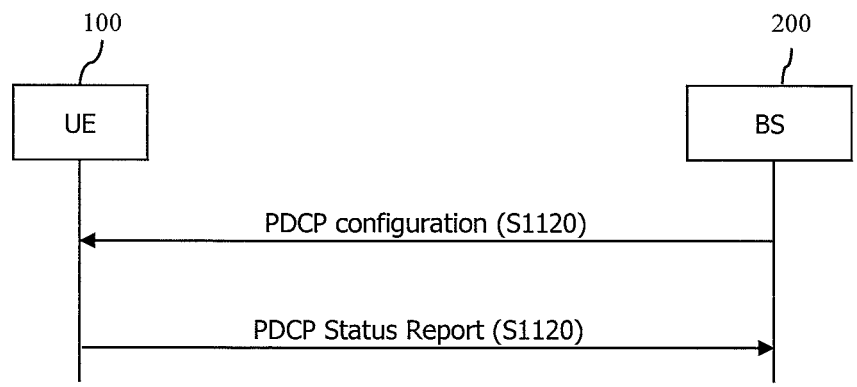
FIG. 11 is a flowchart showing a method according to an embodiment of the present invention.

FIG. 11 is a flowchart showing a method according to an embodiment of the present invention.

In step S1110, a UE 100 receives a PDCP configuration from a BS 200. The PDCP configuration can be received by using an RRC signal. The RRC signal may be an information element (IE) of a Radio Resource Config Dedicated.

The IE of RadioResourceConfigDedicated is used to setup/modify/release RBs, to modify the MAC main configuration, to modify the SPS configuration and to modify dedicated physical configuration.

The IE of RadioResourceConfigDedicated may include an "extendedPDCP-SN-Size" field in table below.

TABLE 1

| |
| --- |
| extendedPDCP-SN-SizeIf a value is configured, the 15-bit PDCP SN format and the extended PDCP Control PDU format for PDCP status report are used. |
| logicalChannelConfigFor SRBs a choice is used to indicate whether the logical channel configuration is signalled explicitly or set to the default logical channel configuration for SRB1 or for SRB2 |
| logicalChannelIdentityThe logical channel identity for both UL and DL. |
| mac-MainConfigAlthough the ASN.1 includes a choice that is used to indicate whether the mac-MainConfig is signalled explicitly or set to the default MAC main configuration, EUTRAN does not apply "defaultValue". |
| measSubframePatternPCellTime domain measurement resource restriction pattern for the PCell measurements (RSRP, RSRQ and the radio link monitoring). |
| physicalConfigDedicatedThe default dedicated physical configuration |
| rlc-ConfigFor SRBs a choice is used to indicate whether the RLC configuration is signalled explicitly or set to the values defined in the default RLC configuration for SRB1 or for SRB2. RLC AM is the only applicable RLC mode for SRB1 and SRB2. E-UTRAN does not reconfigure the RLC mode of DRBs except when a full configuration option is used, and may reconfigure the UM RLC SN field size only upon handover within E-UTRA or upon the first reconfiguration after RRC connection re-establishment. |
| sps-ConfigThe default SPS configuration is specified. Except for handover or releasing SPS, E-UTRAN does not reconfigure sps-Config when there is a configured downlink assignment or a configured uplink grant. |
| srb-Identity Value 1 is applicable for SRB1 only. Value 2 is applicable for SRB2 only. |

Hereinafter, the summary about the problem in the related art and the way to solve the problem as discussed above will be again explained for promoting understanding.

1. PDCP SN Extension 1.1 Introduction

Since the conventional size of the PDCP SN up to 12 bits limits the supported peak data rate by the physical layer, it is required to increase the PDCP SN 1.2 PDCP SN Considering that 2 bits extension of a 12 bits PDCP SN are enough large to cover the data rate for the UE of Rel-10 and for a wireless WLAN router, it is considerable to extend the size of PDCP SN to 14 bits by using two out of three reserved bits.

However, it may be more preferable to extend the PDCP SN up to 15 bits by using three reserved bits, because some candidates for spectrum efficiency, such use of higher frequency band, enhancement of MIMO and beamforming, are being considered.

Therefore, it is proposed to extend the size of the PDCP SN to 15 bits by using three reserved bits 1.3 FMS When size of the PDCP SN is increased, the size of the FMS in the PDCP status report should be increased accordingly because of ambiguity. Therefore, it is also proposed to extend the size of the FMS as the extended size of the PDCP SN.

However, there will be a demand for the further extended size of the PDCP SN in a future. In this case, there would be a need for defining another format for the PDCP status report in the specification. Therefore, it is more preferable to use COUNT value associated with the first missing PDCP SDU.

It is noted that the PDCP statue report is transmitted in limited cases, so an overhead is not a big issue.

Therefore, it is proposed to use the COUNT value associated with the first missing PDCP SDU in the PDCP status report when the PDCP SN extension is configured 1.4 Configurability The present disclosure suggests to have configurability per UE because there is no overhead issue assuming that the reserved bits are used. Although positioning the configuration of the PDCP SN extension in PDCP-Config that is applicable per a radio bearer looks better, it is more preferable to have configurability per UE for simplicity of specifications and implementation.

Therefore, it is proposed to configure the PDCP SN extension per UE, i.e., for all AM DRBs in UL and DL, by RRC signalling 1.5 Considering RAN3 impacts The PDCP SN extension would impact the RAN3 because information on the PDCP SN extension would need to be exchanged between the source eNB and the target eNB for handover preparation.

Therefore, it is proposed to inform RAN3 of the PDCP SN extension.

1.6 Conclusions

In summary, the following is proposed:

Proposal 1: to extend the size of the PDCP SN to 15 bits by using three reserved bits Proposal 2: to use the COUNT value associated with the first missing PDCP SDU in the PDCP status report when the PDCP SN extension is configured Proposal 3: to configure the PDCP SN extension per UE, i.e., for all AM DRBs in UL and DL, by RRC signalling Proposal 4: to inform RAN3 of the PDCP SN extension.

2. PDCP Status Report 2.1 Transmit Operation

When upper layers request a PDCP re-establishment, for radio bearers that are mapped on RLC AM, the UE may perform behaviors as follows:

If the radio bearer is configured by upper layers to send a PDCP status report in the uplink (statusReportRequired), the UE may compile a status report as indicated below after processing the PDCP Data PDUs that are received from lower layers due to the re-establishment of the lower layers, and submit it to lower layers as the first PDCP PDU for the transmission, by:

- setting the FMS field to the PDCP SN of the first missing PDCP SDU if extendedPDCP-SN-Size is not configured, or the FMS_COUNT field to the COUNT value associated with the first missing PDCP SDU if extendedPDCP-SN-Size is configured;
- if there is at least one out-of-sequence PDCP SDU stored, allocating a Bitmap field of length in bits equal to the number of PDCP SNs from and not including the first missing PDCP SDU up to and including the last out-of-sequence PDCP SDUs, rounded up to the next multiple of 8;
- setting as '0' in the corresponding position in the bitmap field for all PDCP SDUs that have not been received as indicated by lower layers, and optionally PDCP SDUs for which decompression have failed;
- indicating in the bitmap field as '1' for all other PDCP SDUs.

2.2 Receive Operation

When a PDCP status report is received in the downlink, for radio bearers that are mapped on RLC AM:

for each PDCP SDU, if any, with the bit in the bitmap set to '1', or with the associated COUNT value less than the COUNT value of the PDCP SDU identified by the FMS field if extendedPDCP-SN-Size is not configured, or the FMS_COUNT field if extendedPDCP-SN-Size is configured, the successful delivery of the corresponding PDCP SDU is confirmed, and the UE may process the PDCP SDU.

2.3 User Plane PDCP Data PDU with Long PDCP SN (12 Bits or 15 Bits)

Figure 12:
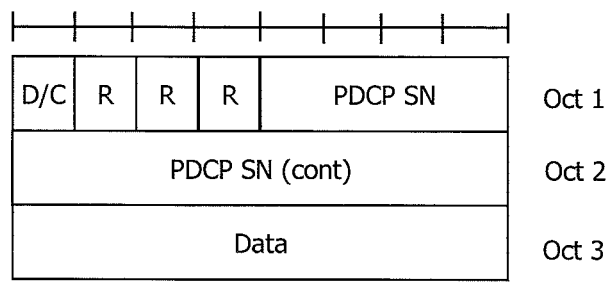
FIG. 12 shows an exemplary format of the PDCP Data PDU.
Figure 12:
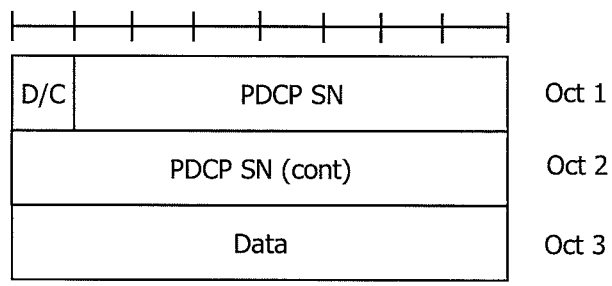

As shown in FIG. 12(a), the format of the PDCP Data PDU having SN of 12 bits is allocated. This format is applicable for PDCP Data PDUs carrying data from DRBs mapped on RLC AM or RLC UM.

As shown in FIG. 12(a), the format of the PDCP Data PDU having SN of 15 bits is allocated. This format is applicable for PDCP Data PDUs carrying data from DRBs mapped on RLC AM.

Meanwhile, as shown in FIG. 9, the format is applicable for DRBs mapped on RLC AM if extendedPDCP-SN-Size is configured.

2.3 PDCP SN

The length of the PDCP SN is one of 5, 7 or 12 bits as indicated in table below.

TABLE 2

| Length | Description |
| --- | --- |
| 5 | SRBs |
| 7 | DRBs, if configured by upper layers (pdcp-SN-Size [3]) |
| 12 | DRBs, if configured by upper layers (pdcp-SN-Size [3]) |
| 15 | DRBs mapped on RLC AM, if configured by upper layer (extendedPDCP-SN-Size [3]) |

2.4 FMS or FMS_COUNT

In case of FMS, PDCP SN of the first missing PDCP SDU is used.

In case of FMS_COUNT, COUNT value associated with the first missing PDCP SDU is used.

2.5 Bitmap

The length of the bitmap field can be 0.

The MSB of the first octet of the type "Bitmap" indicates whether or not the PDCP SDU with the SN (FMS+1) modulo 4096 if extendedPDCP-SN-Size is not configured, or the PDCP SDU with the SN (PDCP SN of COUNT in extended PDCP Control PDU for PDCP status report+1) modulo 32768 if extendedPDCP-SN-Size is configured, has been received and, optionally decompressed correctly. The LSB of the first octet of the type "Bitmap" indicates whether or not the PDCP SDU with the SN (FMS+8) modulo 4096 if extendedPDCP-SN-Size is not configured, or the PDCP SDU with the SN (1+PDCP SN of COUNT in extended PDCP Control PDU for PDCP status report) modulo 32768 if extendedPDCP-SN-Size is configured, has been received and, optionally decompressed correctly.

TABLE 3

| Bit | Description |
| --- | --- |
| 0 | PDCP SDU with PDCP SN = (FMS + bit position) modulo 4096 if extendedPDCP-SN-Size is not configured, or PDCP SDU with PDCP SN (PDCP SN of COUNT in extended PDCP Control PDU for PDCP status report + bit position) modulo 32768 if extendedPDCP-SN-Size is configured, is missing in the receiver. The bit position of $N^{th}$ bit in the Bitmap is N, i.e., the bit position of the first bit in the Bitmap is 1. |
| 1 | PDCP SDU with PDCP SN = (FMS + bit position) modulo 4096 if extendedPDCP-SN-Size is not configured, or PDCP SDU with |

TABLE 3-continued

| Bit | Description |
|---|---|
| | PDCP SN (PDCP SN of COUNT in extended PDCP Control PDU for PDCP status report + bit position) modulo 32768 if extendedPDCP-SN-Size is configured, does not need to be retransmitted. The bit position of N$^{th}$ bit in the Bitmap is N, i.e., the bit position of the first bit in the Bitmap is 1. |

The UE fills the bitmap indicating which SDUs are missing (unset bit—'0'), i.e. whether an SDU has not been received or optionally has been received but has not been decompressed correctly, and which SDUs do not need retransmission (set bit—'1'), i.e. whether an SDU has been received correctly and may or may not have been decompressed correctly.

2.6 State Variables

The state variables are used in PDCP entities in order to specify the PDCP protocol.

All state variables are non-negative integers.

The transmitting side of each PDCP entity shall maintain the following state variables:

a) Next_PDCP_TX_SN

The variable Next_PDCP_TX_SN indicates the PDCP SN of the next PDCP SDU for a given PDCP entity. At establishment of the PDCP entity, the UE may set Next_PDCP_TX_SN to 0.

b) TX_HFN

The variable TX_HFN indicates the HFN value for the generation of the COUNT value used for PDCP PDUs for a given PDCP entity. At establishment of the PDCP entity, the UE may set TX_HFN to 0.

The receiving side of each PDCP entity shall maintain the following state variables:

c) Next_PDCP_RX_SN

The variable Next_PDCP_RX_SN indicates the next expected PDCP SN by the receiver for a given PDCP entity. At establishment of the PDCP entity, the UE shall set Next_PDCP_RX_SN to 0.

d) RX_HFN

The variable RX_HFN indicates the HFN value for the generation of the COUNT value used for the received PDCP PDUs for a given PDCP entity. At establishment of the PDCP entity, the UE shall set RX_HFN to 0.

e) Last_Submitted_PDCP_RX_SN

For PDCP entities for DRBs mapped on RLC AM the variable Last_Submitted_PDCP_RX_SN indicates the SN of the last PDCP SDU delivered to the upper layers. At establishment of the PDCP entity, the UE shall set Last_Submitted_PDCP_RX_SN to 4095 if extendedPDCP-SN-Size is not configured, or 32767 if extendedPDCP-SN-Size is configured.

2.7 Constants a) Reordering_Window

Figure 13:
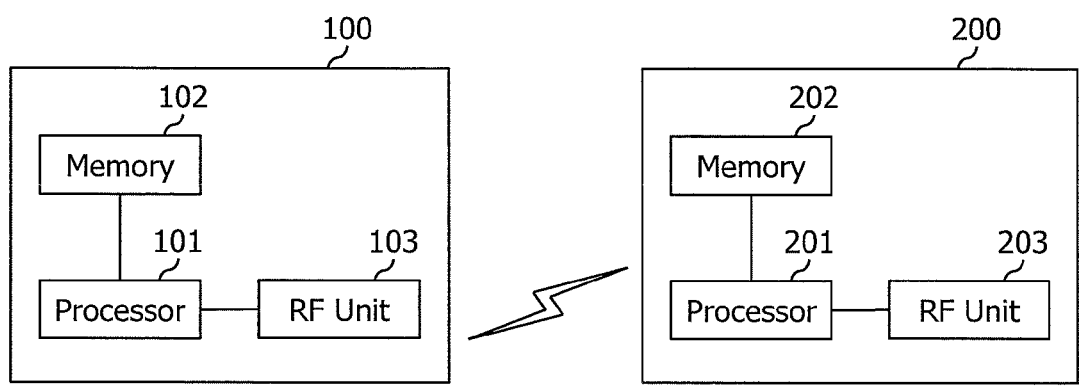
FIG. 13 is a block diagram showing a wireless communication system to implement an embodiment of the present invention.

The Reordering_Window Indicates the size of the reordering window. The size equals to 2048 if extendedPDCP-SN-Size is not configured, or 16384 if extendedPDCP-SN-Size is configured, i.e. half of the PDCP SN space, for radio bearers that are mapped on RLC AM.

b) Maximum_PDCP_SN is as follows:

32767 if the PDCP entity is configured for the use of 15 bits SNs 4095 if the PDCP entity is configured for the use of 12 bit SNs 127 if the PDCP entity is configured for the use of 7 bit SNs 31 if the PDCP entity is configured for the use of 5 bit SNs FIG. 13 is a block diagram showing a wireless communication system to implement an embodiment of the present invention.

An UE 100 includes a processor 101, memory 102, and a radio frequency (RF) unit 103. The memory 102 is connected to the processor 101 and configured to store various information used for the operations for the processor 101. The RF unit 103 is connected to the processor 101 and configured to send and/or receive a radio signal. The processor 101 implements the proposed functions, processed, and/or methods. In the described embodiments, the operation of the UE may be implemented by the processor 101.

A BS 200 includes a processor 201, memory 202, and an RF unit 203. The memory 202 is connected to the processor 201 and configured to store various information used for the operations for the processor 201. The RF unit 203 is connected to the processor 201 and configured to send and/or receive a radio signal. The processor 201 implements the proposed functions, processed, and/or methods. In the described embodiments, the operation of the BS may be implemented by the processor 201.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The invention claimed is:

1. A method for transferring a status report in a wireless communication system, the method comprising:
configuring a Packet Data Convergence Protocol (PDCP) status report used by a PDCP layer located above a Radio Link Control (RLC) layer, wherein if a field of an extended PDCP sequence number regarding the PDCP status report is configured, the PDCP status report includes an indicator indicating a count value of a first non-received PDCP service data unit (SDU); and
transferring the configured PDCP status report to a lower layer,
wherein the indicator is a first missing sequence number count (FMS COUNT) value which contains the count value of the first non-received PDCP SDU, and
wherein the field of the extended PDCP sequence number is extended up to 15 bits by using three reserved bits.

2. The method of claim 1, wherein the PDCP status report further includes a bitmap providing the status information for a set of SDUs following the first non-received SDU.

3. The method of claim 2, wherein the bitmap is filled to indicate which PDCP SDUs are missing and indicate which PDCP SDUs do not need retransmission.

4. The method of claim 3, wherein in the bitmap, the PDCP SDUs indicated as being missing denotes whether a PDCP SDU has not been received or has been received but has not been decompressed correctly.

5. The method of claim 3, wherein, in the bitmap, the PDCP SDUs indicated as not needing retransmission denotes whether a PDCP SDU has been received correctly.

6. The method of claim 4, wherein a '0' bit in the bitmap indicates the PDCP SDU with PDCP Sequence Number= (the PDCP SN of the FMS COUNT+bit position) modulo (maximum PDCP SN+1) is missing.

7. The method of claim 5, wherein a '1' bit in the bitmap indicates the PDCP SDU with PDCP Sequence Number= (the PDCP SN of the FMS COUNT+bit position) modulo (maximum PDCP SN+1) does not need to be retransmitted.

8. The method of claim 1, wherein the FMS COUNT has a size of 32 bits located between a Protocol Data Unit (PDU) type field and the bitmap in the PDCP status report.

9. A communication device configured for transferring a status report in a wireless communication system, the communication device comprising:
   a configuring unit configured to configure a Packet Data Convergence Protocol (PDCP) status report used by a PDCP layer located above a Radio Link Control (RLC) layer,
   wherein if a field of an extended PDCP sequence number regarding the PDCP status report is configured, the PDCP status report includes an indicator indicating a count value of a first non-received PDCP service data unit (SDU); and
   a transmission unit configured to transfer the configured PDCP status report to a lower layer,
   wherein the indicator is a first missing sequence number count (FMS COUNT) value which contains the count value of the first non-received PDCP SDU, and
   wherein the field of the extended PDCP sequence number is extended up to 15 bits by using three reserved bits.

10. The communication device of claim 9, wherein the PDCP status report further includes a bitmap providing the status information for a set of SDUs following the first non-received SDU.

11. The communication device of claim 10, wherein the bitmap is filled to indicate which PDCP SDUs are missing and indicate which PDCP SDUs do not need retransmission.

12. The communication device of claim 11, wherein in the bitmap, the PDCP SDUs indicated as being missing denotes whether a PDCP SDU has not been received or has been received but has not been decompressed correctly.

13. The communication device of claim 11, wherein, in the bitmap, the PDCP SDUs indicated as not needing retransmission denotes whether a PDCP SDU has been received correctly.

14. The communication device of claim 12, wherein a '0' bit in the bitmap indicates the PDCP SDU with PDCP Sequence Number=(the PDCP SN of the FMS COUNT+bit position) modulo (maximum PDCP SN+1) is missing.

15. The communication device of claim 13, wherein a '1' bit in the bitmap indicates the PDCP SDU with PDCP Sequence Number=(the PDCP SN of the FMS COUNT+bit position) modulo (maximum PDCP SN+1) does not need to be retransmitted.

16. The communication device of claim 9, wherein the FMS COUNT has a size of 32 bits located between a Protocol Data Unit (PDU) type field and the bitmap in the PDCP status report.

* * * * *